Oct. 22, 1968     JEAN-MARIE MASSOUBRE     3,407,046

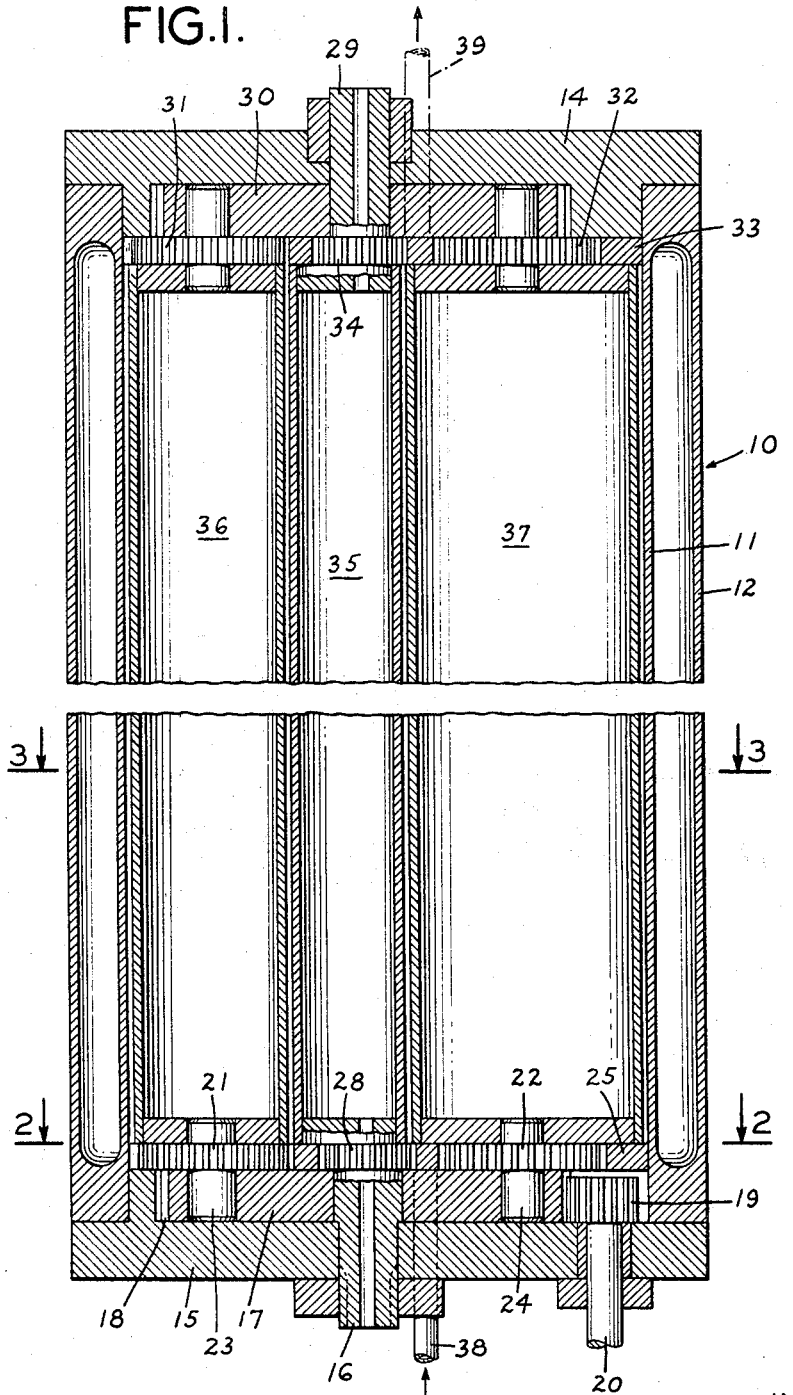

REACTOR FOR CONTINUOUS POLYMERIZATION

Filed Jan. 27, 1966                      2 Sheets-Sheet 2

INVENTOR
JEAN-MARIE MASSOUBRE
BY

HIS ATTORNEYS

United States Patent Office 3,407,046
Patented Oct. 22, 1968

3,407,046
REACTOR FOR CONTINUOUS POLYMERIZATION
Jean-Marie Massoubre, Clermont-Ferrand, France, assignor to Compagnie Generale des Etablissements Michelin, raison sociale Michelin & Cie, Clermont-Ferrand, Puy-de-Dome, France
Filed Jan. 27, 1966, Ser. No. 523,342
Claims priority, application France, Feb. 1, 1965, 3,889
3 Claims. (Cl. 23—285)

ABSTRACT OF THE DISCLOSURE

A reactor for the production of polymers is provided with a hollow cylindrical shell and an eccentrically-mounted carrier gear. Rotors oval in cross-section are mounted on the carrier gear and simultaneously rotate and gyrate to wipe the interior wall of the shell. The gyration is about the axis of the carrier gear and eccentric with respect to the axis of the shell.

---

This invention relates to improvements in apparatus for conducting chemical reactions and it relates particularly to improvements in reactors for the production of polymers such as, for example, polyurethane, polystyrene, polybutadiene, polyisoprene, polyisopropylene and the like.

In the Massoubre et al. U.S. Patent No. 3,060,160 are described polymerization processes which involve the displacement with a uniform movement of a mixture being treated during a polymerization reaction to the end that the residence time in the reactor is essentially the same for all of the mixture passing through the reactor. In order to achieve this result, it is necessary to prevent the retrogressive movement of the mixture in the reactor and also to prevent the retention of mixtures along the walls of the reactor due to the skin friction effect of the surfaces and, moreover, avoid any tendency of the mixture nearer the walls to react unevenly due to a different temperature immediately adjacent the wall of the reactor.

In the Massoubre U.S. application Ser. No. 375,862, filed June 17, 1964, is disclosed a reactor by means of which the uniform residence time of the reaction mixture is promoted and in which the mixture is caused to flow without retrogressive motion along the length of the reactor while the walls of the reactor are being scraped or cleared of material adjacent thereto to assure the homogeneity of the mixture.

The present invention is an improvement in reactors in which not only the homogeneity and uniform flow without retrogressive motion is assured but which at the same time provides a gentle mixing and pumping action to assist in the steady and uniform flow of the reaction mixture through the reaction chamber.

More particularly, in accordance with the present invention, a reactor is provided which includes at least one rotor of a uniform oval cross-section throughout its length, the rotor or rotors being constructed and arranged to wipe or scrape against the walls of the reaction chamber and, in the case of multiple rotors, to wipe or scrape each other and at the same time divide the reaction chamber into variable capacity chambers and thereby provide a pumping action which causes the flow of the reaction mixture from one end of the reaction chamber to the other without substantial mixing action which would cause retrograde movement of the mixture.

In a preferred form of the invention, the reaction chamber contains a generally centrally located rotating and gyrating rotor preferably of cylindrical shape which cooperates with another pair of rotating rotors of oval cross-section, the rotors being arranged so that their surfaces are caused to wipe or come in close contact with the walls of the reaction chamber and each other, whereby stagnation of the reaction mixture adjacent these surfaces is avoided. In this way, a steady and uniform but slightly pulsating flow takes place due to the rotational oval rotor or rotors causing each increment of the mixture to be retained in the reaction chamber for the same period of time and assuring the production of a uniformly reacted end product.

For a better understanding of the present invention, reference may be had to the accompanying drawings, in which:

FIGURE 1 is a view in vertical section of a typical reactor embodying the present invention;

Figure 3:
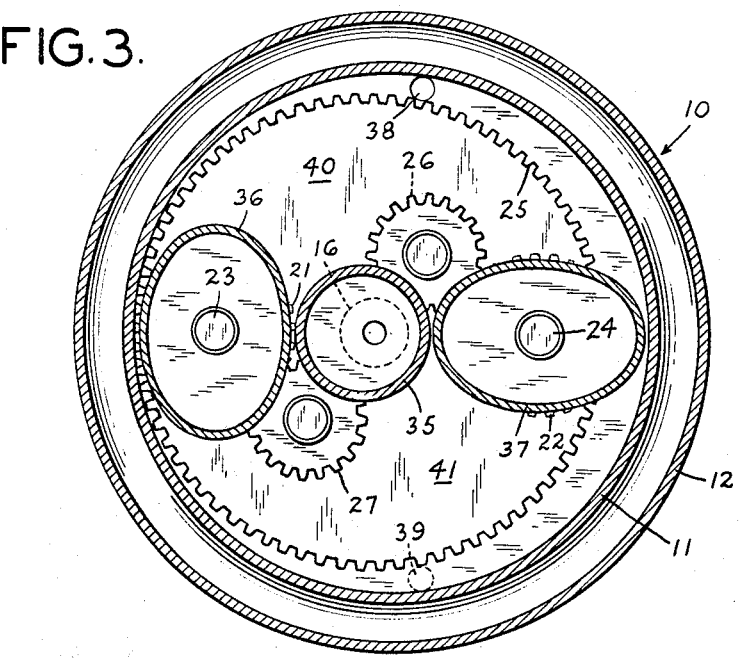
FIGURE 3 is a view in cross-section taken on line 3—3 of FIGURE 1.

As illustrated in the drawings, the reactor includes a cylindrical jacket or shell 10 having spaced apart walls 11 and 12 between which a fluid such as vapor or liquid can be circulated in order to regulate the temperature of the reaction mixture. End plates or heads 14 and 15 are hermetically sealed to the opposite ends of the jacket 10. Extending upwardly through and rotatable relative to the end plate 15 is a hollow shaft 16 on which is rotatably mounted a flat carrier gear 17 having peripheral gear teeth 18 thereon. The carrier gear 17 is driven by means of a pinion 19 mounted on a shaft 20 which extends through the head 15 and is driven by a motor or other source of power. Rotatably mounted on the carrier gear 17 are a pair of gears 21 and 22 which have stub shafts 23 and 24 rotatably mounted in the carrier gear 17. A ring or internal gear 25 fixed to the jacket 10 meshes with the gears 21 and 22. It should be noted that the shaft 16 is mounted eccentrically with relation to the axis of the jacket 10 as is the ring gear 25. The carrier gear 17 also supports rotatably a pair of transfer or idler gears 26 and 27 (FIGURE 3) which are in mesh with the gears 21 and 22, respectively, and a sun gear 28 fixed to the shaft 16, thereby providing a planetary gear train in which rotation of the carrier gear 17 causes the gears 21 and 22 to roll around the internal gear 25 and transmit their rotation through the transfer gears 26 and 27 to the sun gear 28, thereby causing the shaft 16 to rotate. A similar planetary gear train is mounted adjacent the head 14 and includes an eccentrically mounted shaft 29 coaxial with the shaft 16, fixed on the shaft 29, a carrier gear 30, the planet gears 31 and 32, an internal gear 33, transfer gears, not shown, corresponding to the gears 26 and 27 and a sun gear 34. The carrier gear 30 may or may not be driven by an external source of power.

Extending between and fixed to the lower shaft 16 and the upper shaft 29 and eccentric to the axes of these shafts is a cylindrical hollow rotor 35. The temperature of the hollow rotor 35 may be controlled by supplying vapor or liquid through hollow shaft 16 for discharge through the hollow shaft 29 or vice versa, as may be desired. Extending between the gears 21 and 31 and fixed thereto is a hollow rotor 36 which, as shown in FIGURE 3, is of oval cross-section. A similar rotor 37 extends between and is fixed to the gears 22 and 32. The major axis of the oval cross-section of the rotor 36 is perpendicular to the major axis of the oval cross-section of the rotor 37 when in the position shown in FIGURE 3. The shapes of the rotors 35, 36 and 37 and the eccentricities and spacing between the axes of the rotors are such that in all positions of the rotors relative to each other and to the surface of the inner wall 11 of the jacket, the rotors 36 and 37 are in wiping contact or in only slightly spaced relation to the wall 11 and also are in wiping or substantially wiping contact with the outer surface of the intermediate cylindrical rotor 34. Due to the shapes and arrangements of these rotors, the above-mentioned wiping relationship is maintained during the operation of the reactors, as described hereinafter.

A reaction mixture can be introduced into the reactor through an inlet conduit 38 in the bottom of the reactor while the reaction product can be discharged continuously through a discharge conduit 39 at the upper end of the reactor.

Figure 2:
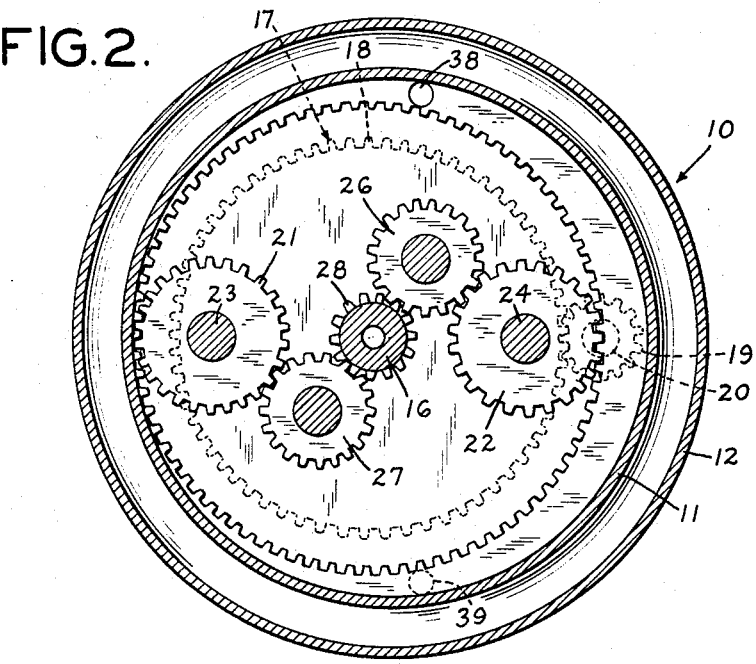
FIGURE 2 is a view in cross-section taken on line 2—2 of FIGURE 1.

As shown in FIGURES 2 and 3, the inlet and outlet conduits are spaced apart a distance less than 180° in a clockwise direction from the inlet conduit 38 to the outlet conduit 39 and thus communicate successively with chambers 40 and 41 which are defined by the rotors and the inner wall 11 of the packet. While the reaction mixture is being introduced through the inlet conduit 38, the shaft 20 is driven and the gear carriers 17 and 30 are rotated around the axis of the shafts 16 and 29. Inasmuch as the rotors connect the gear elements of the upper and lower gear trains, the planet pinions 21, 22, 31 and 32 roll around the respective internal gears 25 and 33. Rotation of the planet gears is imparted to the transfer gears and these gears in turn rotate the shafts 16 and 29. As a consequence, the rotors 35, 36 and 37 are all rotated but in a direction opposite to that of the carrier gears 17 and 30 while the rotor 35 also gyrates bodily in the same direction as the carrier gears 17 and 30. The eccentricity of the axes of the carrier gears, together with the eccentricity of the central rotor 35 and the oval cross-section of the rotors 36 and 37 cause a complemental gyrating action and rotary action thereof which enables the oval rotors 36 and 37 to wipe around the wall 11 in contact with or at a uniformly small distance therefrom and also wipe or slide in close proximity to the internal rotor 35.

Accordingly, any material which is present in the chambers 40 and 41 will be carried around with the rotors and flow vertically in the chambers 40 and 41 and will be subjected to slight pulsation due to the gyration and rotation of the rotors 35, 36 and 37 which vary the capacities of the chambers 40 and 41 and after a predetermined residence time in the reactor will be discharged through the discharge conduit 39. Inasmuch as the pulsations or gyrations are horizontally directed, there is no tendency to mix material in the upper part or upper zones of the reaction chamber with the incoming mixture or portions of the reaction mixture in the lower zones thereof, while nevertheless a more homogeneous mixture is provided in the several strata due to the horizontal mixing effect. In addition, the pumping action mentioned above, due to the changes in the relative capacities of the chambers 40 and 41, assists the flow of the material vertically through thhe reaction chamber, thereby reducing the amount of power or pumping energy required to supply the reaction mixture through the inlet conduit 38. In this way, a very uniform reaction can take place within the reaction mixture due to its homogeneous nature and uniform residence of all increments of the reaction mixture in the reaction chamber.

It will be understood that the apparatus described above is illustrative and that changes can be made in the number of rotors and the shape and arrangement of the rotors in the reaction chamber. Thus, for example, a single cylindrical rotor can be provided together with an oval cross-section rotor or two oval cross-section rotors can be provided which are in wiping contact with each other and the external walls of the reaction chamber. Also the reactor may include a single rotor of elongated oval cross-section and a lesser diameter about equal to the radius of the reaction chamber, mounted for rotation and eccentric gyration so that its surface is wiped while wiping the inner surface of the reaction chamber. Accordingly, it will be understood that the invention is susceptible to considerable modification within the scope of the invention as defined in the following claims.

What is claimed is:

1. An apparatus for conducting chemical reactions comprising a hollow substantially cylindrical shell, at least one rotor of oval cross-section extending lengthwise in said shell in substantially wiping engagement with an inner surface of said shell, means for rotating said rotor and moving said rotor eccentrically to the axis of said shell to wipe the inner surface of said shell and the surface of said rotor, means for introducing a reaction mixture into said shell adjacent to one end of said shell, means for discharging a reaction product from the other end of said shell, a second substantially cylindrical rotor and a third rotor of oval cross-section, said one and third rotors being disposed on opposite sides of said second rotor and in substantially wiping engagement with said second rotor and said inner surface, means supporting said second rotor for rotation and gyration in a path eccentric to the axis of said shell, means supporting said oval rotors for rotation and movement in an orbital path around said second rotor and eccentric to said axis and means connecting said rotors for rotating and moving them in said respective paths.

2. An apparatus for conducting chemical reactions comprising a hollow substantially cylindrical shell, at least one rotor of oval cross-section extending lengthwise in said shell in substantially wiping engagement with an inner surface of said shell, means for rotating said rotor and moving said rotor eccentrically to the axis of said shell to wipe the inner surface of said shell and the surface of said rotor, means for introducing a reaction mixture into said shell adjacent to one end of said shell, means for discharging a reaction product from the other end of said shell, a second substantially cylindrical rotor and a third rotor of oval cross-section, said one and third rotors being disposed on opposite sides of said second rotor and in substantially wiping engagement with said second rotor and said inner surface, a shaft rotatably mounted in said shell and extending lengthwise of said shell eccentric to and substantially parallel with the axis of said shell, a carrier member rotatably mounted on said shaft, means supporting said oval rotors for rotation on said carrier member around axes in substantially equally spaced relation to the axis of said shaft, said second rotor being fixed to said shaft eccentric to its axis, means for rotating said carrier member, and planetary gearing connecting said shaft and said means supporting said oval rotors for rotating all of said rotors and maintaining said oval rotors substantially in wiping engagement with said cylindrical rotor and said inner surface of said shell.

3. An apparatus for conducting chemical reactions comprising a hollow substantially cylindrical shell, a carrier gear mounted eccentrically with respect to said shell and rotatable about an axis parallel to and displaced from the axis of said shell, at least one rotor of oval cross-section extending lengthwise in said shell mounted on and carried by said carrier gear in substantially wiping engagement with an inner surface of said shell, means for rotating said carrier gear and thereby rotating said rotor and simultaneously moving said rotor eccentrically about the axis of said shell to wipe the inner surface of said shell and the surface of said rotor, means for introducing a reaction mixture into said shell adjacent to one end of said shell, and means for discharging a reaction product from the other end of said shell.

References Cited

UNITED STATES PATENTS 2,238,864    4/1941    Pratt et al. _____ 259—5
2,883,162    4/1959    Rapson _____ 165—61

JAMES H. TAYMAN, Jr., *Primary Examiner.*